3,541,039
FLEXIBLE POLYMERIC VINYLIDENE FLUORIDE COMPOSITIONS

Alfred C. Whiton, Norristown, Pa., assignor to Pennwalt Corporation, Philadelphia, Pa., a corporation of Pennsylvania
No Drawing. Filed Aug. 27, 1962, Ser. No. 219,742
Int. Cl. C08f 29/22, 3/22, 45/36
U.S. Cl. 260—31.6
9 Claims

ABSTRACT OF THE DISCLOSURE

Crystalline polymeric vinylidene fluoride is plasticized with minor amounts of a linear saturated polymeric polyester having a molecular weight below about 5000 to form compositions having high flexibility and workability in sheet, film, rod or tubing form.

---

This invention relates to compositions of polymeric vinylidene fluoride. More particularly it relates to a composition comprising crystalline polymeric vinylidene fluoride with a linear saturated polymeric polyester.

Polymers of vinylidene fluoride can be prepared by polymerization methods as taught by Ford in U.S. 2,435,537 and by Hauptschein in U.S. 3,012,021.

Free radical polymerization of vinylidene fluoride monomer, e.g. as taught in the above patents, results in the formation of a polymer averaging more than 2000 monomer units per chain. The highly regular structure of the polymer molecule permits close packing of the

units of the polymer chain. The resultant polymer is a crystalline polyvinylidene fluoride which exhibits remarkable physical properties of strength, rigidity and resilience. The resistance of the polymer to attack by acids, bases, and organic chemicals is outstanding.

Polymers of vinylidene fluoride containing more than 95 mol percent vinylidene fluoride, e.g., homopolymers of vinylidene fluoride and copolymers of vinylidene fluoride containing less than 5 mole percent of another monomer, e.g. a haloethene, can be fabricated into various commercially useful forms by various molding procedures, such as compression, transfer and injection molding or by extrusion. Thus, substantially rigid sheets, gaskets, rods, bottles, tubing, and molded and machined forms of many articles can be made which are particularly suited for continuous service at temperatures up to about 300° F. under severe chemical conditions in the presence of acids, alkalies, strong oxidizing agents and halogens.

However, due to the crystalline structure of these vinylidene fluoride polymers, the utility of such polymers is limited to articles of manufacture in which relatively rigid form is not objectionable. A more flexible form of polymeric vinylidene fluoride is needed for many uses. My invention provides a means for filling this need. For example, such items are flexible thin-walled tubing, flexible wire coating, flexible filaments useful as thread or for fishlines, flexible films useful as wrapping material, and flexible molded articles useful as containers are made through practice of my invention. Thus, by practice of my invention commercially useful flexible products are made in which the inherent properties of polymeric vinylidene fluoride are retained. As used in the description of the invention, the term flexible is intended to have the meaning commonly attached to it in the plastics art.

It is well known in the art that some polymers can be modified to increase flexibility or to reduce stiffness by adding to the polymer a material known in the art as a plasticizer. An exact definition of the term plasticizer which would include all materials which may find use as plasticizer is not available. In general, however, a satisfactory plasticizer for a particular polymer is a material which shows the properties of compatibility, permanence, stability to heat and hydrolysis and efficiency in producing flexibility when mixed with the polymer. Other properties such as electrical resistance, color, odor, lustre, toxicity and resistance to weathering, abrasion and impact may be of importance in a particular use and must be taken into consideration when the particular property is necessary. The discovery of a material which will possess an optimum number of the above qualities for a particular polymer is of major importance, since no one plasticizer can meet all the above requirements, and because each material must be evaluated individually for each new polymer.

A suitable plasticizer for polymeric vinylidene fluoride is particularly needed in order that the desirable commercial properties of this polymer can be more fully utilized by making the polymer available in an easily flexed, more readily workable form. However, the search for a suitable plasticizer for polymeric vinylidene fluoride has been complicated by the crystalline nature of the polymer which precludes compatibility with the polymer of many materials known to be plasticizers for vinyl compounds. In this respect, polyvinylidene fluoride resembles polyvinylidene chloride, which also is a highly crystalline polymer and which is well known to be incompatible with the usual plasticizer materials. In the case of polyvinylidene chloride the problem has been overcome commercially by copolymerizing the vinylidene chloride monomer with another monomer, for example, with vinyl chloride to form Saran. A procedure which has been found practical for the plasticization of a partially crystalline polymer, polychlorotrifluoroethylene, as taught by Smith in U.S. 2,789,959 and 2,789,960, consists in physically mixing a homopolymer of trifluorochloroethylene with a suitable flexible copolymer of trifluorochloroethylene and another monomeric material, e.g. vinylidene fluoride, to form, finally, a flexible plasticized mass. Also, plasticization of non-crystalline copolymers of trifluorochloroethylene and vinylidene fluoride containing between about 20 and 69 mol percent of trifluorochloroethylene with an ester formed by reacting a monohydric compound, e.g., an alcohol or a phenol, with an acid is taught by Robb et al., in U.S. 2,849,412. In still another method for plasticization of a fluorine-containing polymer, Barnhart in U.S. 2,820,722 teaches use of an open chain distillable telomer of chlorotrifluoroethylene for plasticization of vinylidene fluoride polymer and of a noncrystalline copolymer of vinylidene fluoride and another olefin. Barnhart also teaches, in U.S. 2,884,399, use of a novel tetraester (prepared by transesterifying an alcohol, a dicarboxy compound and a dihydric compound) as a plasticizer for a non-crystalline copolymer of vinylidene fluoride with perfluorochloroolefins.

It is to be noted that the above art generally pertains to noncrystalline or partially crystalline copolymers wherein the amount of vinylidene fluoride monomer used to prepare the copolymer containing vinylidene fluoride is present in an amount less than 80 mol percent. Also, it is to be noted that Barnhart U.S. 2,820,772, although teaching plasticization of mohopolymer vinylidene fluoride, teaches that the plasticizer which is used is derived from a material closely related chemically to vinylidene fluoride, i.e., chlorotrifluoroethylene.

Another factor which restricts the materials which can be used as plasticizers for polymeric vinylidene fluoride is that temperatures above about 500° F. are required in its fabrication. In contrast to this polymer, polymeric vinylidene chloride and polymeric vinyl chloride, for example, are fabricated at temperatures below 400° F. Consequently, a plasticizer material which may be effective on the basis that it imparts plasticity to the latter two polymers, may not be an acceptable material for use in plasticizing polymeric vinylidene fluoride because the material lacks heat stability or is highly volatile at temperatures necessary for fabrication of this polymer.

I have now found that csrystalline polymers of vinylidene fluoride containing more than 95% of vinylidene fluoride, particularly those selected from the group consisting of a crystalline homopolymer of vinylidene fluoride and of a crystalline copolymer formed by copolymerizing vinylidene fluoride with less than 5 mol percent of a haloethene, e.g. chlorotrifluoroethylene, tetrafluoroethylene, dichlorodifluoroethylene and trifluoroethylene, can be plasticized to form a novel, predominantly polymeric vinylidene fluoride composition, having high flexibility and workability in sheet, film, rod or tubing form by mixing 100 parts by weight of the polymer with from about 0.5 to about 45 parts of linear saturated polymeric polyester consisting essentially of recurring units of the formula

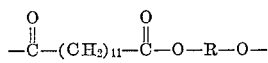

in which $n$ is an integer from 4 to 8 inclusively and R is an alkylene group having from 4 to 7 carbon atoms inclusively, said polyester having a molecular weight below about 5000.

The polyesters useful for practicing my invention are known and many are readily available commercially. They can be prepared by known methods from commercially available higher glycols and dihydric acids. Methods of preparation of the polyesters are taught, for example, by Carothers et al., Journal of the American Chemical Society, vol. 51, page 2560 (1929) and by Moll, German Pat. 566,519.

The reaction involved in formation of the linear saturated polymeric polyesters is represented by the following equation in which adipic acid and butylene glycol (1,3-butanediol) are used as representative reactants to form polymeric 1-methyl propylene adipate:

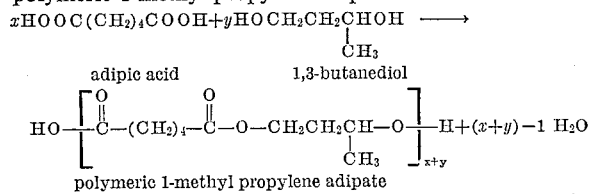

The polyesters formed as shown above will normally have a molecular weight of from about 1100 to about 5000. They possess boiling points above about 400° C. and are thermally stable up to about 400° C.

The higher glycols which can be used to prepare the linear saturated polymeric polyesters used in practicing my invention include 1,3-butanediol (butylene glycol), 1,4-butanediol, 2,3-butanediol, 2,4-pentanediol, 1,5-pentanediol, 1,6-hexanediol, 2,5-hexanediol, 2-methyl-1,3-pentanediol, 2-methyl-2,4-pentanediol, 2,3-dimethyl-2,3-butanediol, 2,4-heptanediol, 2,2-diethyl-1,3-propanediol, 2-ethyl-1,3-hexanediol, 2-ethyl-2-n-butyl-1,3-propanediol, and neopentylene glycol (2,2-dimethyl-1,3-propanediol, $HOCH_2C(CH_3)_2 CH_2OH$, usually referred to as neopentyl glycol). Especially preferred glycols are butylene glycol and neopentyl glycol.

The dihydric acids which can be used to prepare the linear saturated polymeric polyesters are the saturated dicarboxylic acids conforming with the general formula $(CH_2)_x(COOH)_2$ in which $x$ is an integer from 4 to 8 inclusively. These acids include adipic, pimelic, suberic, azelaic and sebacic acid. Especially preferred dihydric acids are adipic acid and sebacic acid.

Linear saturated polymeric polyesters which can be used in the practice of my invention include the linear polymeric form of each of the following esters having a molecular weight below about 5000:

1-methyl propylene adipate
1-methyl propylene pimelate
1-methyl propylene suberate
1-methyl propylene azelate
1-methyl propylene sebacate
butylene adipate
butylene pimelate
butylene suberate
butylene azelate
butylene sebacate
1,2-dimethyl ethylene adipate
1,2-dimethyl ethylene pimelate
1,2-dimethyl ethylene suberate
1,2-dimethyl ethylene azelate
1,2-dimethyl ethylene sebacate
1,3-dimethyl propylene adipate
1,3-dimethyl propylene pimelate
1,3-dimethyl propylene suberate
1,3-dimethyl propylene azelate
1,3-dimethyl propylene sebacate
pentylene adipate
pentylene pimelate
pentylene suberate
pentylene azelate
pentylene sebacate
hexylene adipate
hexylene pimelate
hexylene suberate
hexylene azelate
hexylene sebacate
1,4-dimethyl butylene adipate
1,4-dimethyl butylene pimelate
1,4-dimethyl butylene suberate
1,4-dimethyl butylene azelate
1,4-dimethyl butylene sebacate
1-ethyl-2-methyl propylene adipate
1-ethyl-2-methyl propylene pimelate
1-ethyl-2-methyl propylene suberate
1-ethyl-2-methyl propylene azelate
1-ethyl-2-methyl propylene sebacate
1,3,3-trimethyl propylene adipate
1,3,3-trimethyl propylene pimelate
1,3,3-trimethyl propylene suberate
1,3,3-trimethyl propylene azelate
1,3,3-trimethyl propylene sebacate
1,1,2,2-tetramethyl ethylene adipate
1,1,2,2-tetramethyl ethylene pimelate
1,1,2,2-tetramethyl ethylene suberate
1,1,2,2-tetramethyl ethylene azelate
1,1,2,2-tetramethyl ethylene sebacate
1-methyl-3-n propyl propylene adipate
1-methyl-3-n propyl propylene pimelate
1-methyl-3-n propyl propylene suberate
1-methyl-3-n propyl propylene azelate
1-methyl-3-n propyl propylene sebacate
2,2-diethyl propylene adipate
2,2-diethyl propylene pimelate
2,2-diethyl propylene suberate
2,2-diethyl propylene azelate
2,2-diethyl propylene sebacate
1-n propyl-2-ethyl propylene adipate
1-n propyl-2-ethyl propylene pimelate
1-n propyl-2-ethyl propylene suberate
1-n propyl-2-ethyl propylene azelate
1-n propyl-2-ethyl propylene sebacate
2-ethyl-2-n butyl propylene adipate
2-ethyl-2-n butyl propylene pimelate
2-ethyl-2-n butyl propylene suberate
2-ethyl-2-n butyl propylene azelate
2-ethyl-2-n butyl propylene sebacate
2,2-dimethyl propylene adipate
2,2-dimethyl propylene pimelate
2,2-dimethyl propylene suberate
2,2-dimethyl propylene azelate
2,2-dimethyl propylene sebacate Especially preferred linear saturated polymeric polyesters are polymeric 2,2-dimethyl propylene sebacate and polymeric 1-methyl propylene adipate.

The techniques and procedures used in practicing this invention to prepare my novel plasticized composition are the usual ones used in mixing a plasticizer with a polymer. The mixing can be done in any one of several known ways, using either a dry or wet blending technique. For dry blending, the polymer and plasticizer are simply mixed in a conventional type blender, such as a V-cone, ribbon or sigma blade blender, until a thorough mixture is obtained. For wet blending, the plasticizer is first dissolved in a volatile low boiling solvent whose boiling point is below the softening point of the polymer, about 200° C. (400° F.), and which exhibits solvation for the plasticizer, but not for the polymer. Examples of such solvents are the aromatic hydrocarbon solvents such as benzene, toluene, xylene, etc. The solution of plasticizer is then added to the polymer while continuously stirring the latter. When dispersion of the solution in the polymer is completed, the solvent is volatilized, leaving a blended mixture which then is ready for use in various known ways. The preferred blending technique, because of its simplicity and cost, is the dry blending procedure, but the wet blending method gives a somewhat better dispersion. However, when the mixture is to be banded on a mill or further mixed with fillers and other ingredients, dry blending is usually equally satisfactory.

The amount of plasticizer used in forming my polymeric vinylidene fluoride-plasticizer composition will usually be in the ratio range of about 0.5 to about 15 parts by weight of plasticizer to 100 parts of polymer of vinylidene fluoride. At a plasticizer-polymer ratio above about 15:100, exudation of some plasticizer may be experienced at elevated temperatures. This factor is important only where no other material is present in the mass. Much more than 15 parts of plasticizer up to a ratio of 45:100, can be used in practice by use of adsorbent fillers in the plasticized mass, or when use service is to be at temperatures below ambient temperature.

As indicated above, use of a linear saturated polymeric polyester as a plasticizer for crystalline polymer of vinylidene fluoride provides a means for preparing a flexible product. In addition, the use of this polyester in combination with polymeric vinylidene fluoride improves the workability characteristics of polymeric vinylidene fluoride mass by greatly reducing polymer melt viscosity during handling of the polymer mass on banding mills, in extruders, and in molding machines. When a flexible product is to be prepared by the practice of my invention, I prefer to use for such purpose a composition containing from 5 to 15 parts of plasticizer per 100 parts of polymeric vinylidene fluoride. When it is desired to provide polymeric vinylidene fluoride having improved workability characteristics without greatly improved flexibility of the polymer product, I prefer to use for such purpose a composition containing not more than 5 parts of plasticizer per 100 parts of polymer, and especially prefer to use a composition containing an amount of plasticizer in the range from about 1 to 3 parts per 100 parts of polymeric vinylidene fluoride.

The novel composition of this invention is useful for the preparation of flexible articles as disclosed above, by various procedures known to those skilled in the art, e.g., by molding, extruding, banding on mill rolls, spraying, and deposition from a solvent. The articles so prepared possess high flexibility, good heat stability, and absence of properties evidencing incompatibility of plasticizer with polymer, such as exudation, opaqueness, bubbles, and surface imperfections. By means of my invention, filled as well as nonfilled forms of plasticized polymer of vinylidene fluoride can be made. For example, various fillers known to the art can be mixed into the plasticized polymer mass or mixed with the plasticizer and then added to the polymer. Thus, wood powder, talc, carbon, asbestos, glass fibers, colorants in the form of both natural and synthetic materials, dyes and other similar filling and modifying materials can be readily worked into the polymer mass or into the premix used to prepare the final flexible product based on polymer of vinylidene fluoride.

The presence of the linear saturated polymeric polyester in the polymeric vinylidene fluoride mass results in the reduction of the melt viscosity of the mass. This feature permits faster extrusion of the polymer into fiber and tubing forms. It also reduces friction during milling and banding of the polymer on roll mills. The effect of various amounts of plasticizer on the flow properties of polymer of vinylidene fluoride is shown in Table I. The melt indexes (amount of polymer extruded under standard condition of temperature, pressure, time, and orifice setting) shown in Table I were determined in accordance with method ASTM D1238–57T, Condition J, (1250 g., 3 minutes, standard orifice and pressure).

TABLE I

| Plasticizer,[1] Parts per 100 of polymer | Melt index at 265° C. |
|---|---|
| 0 | 3.900 |
| 1 | 5.325 |
| 3 | 7.634 |
| 5 | 7.592 |
| 10 | 12.883 |

[1] Polymeric 2,2-dimethyl propylene sebacate.

The data in Table I show that the presence in the polymer mass of as little as 3 parts of plasticizer of this invention results in the doubling of the flow rate of the polymer.

The novelty of the invention and its practice are further shown in the following examples. Where data is shown as that obtained with homopolymer of vinylidene fluoride, it is to be understood that this is the severest test condition and that the inveniton can be practiced equally well with crystalline polymeric vinylidene fluoride containing less than 5 mol percent of haloethane monomer.

EXAMPLE 1

The efficiency of a plasticizing material can be determined empirically by comparing the relative increase in surface area of plasticized polymer with that of nonplasticized polymer pressed under identical conditions of weight, time, temperature and pressure. The property so determined is defined as plasticity. To determine the plasticity, a sample of the polymer weighing 0.5 gram is heated at atmospheric pressure between two aluminum molding plates in a press at a temperature of 225° C. for 0.5 minute, followed by heating at the same temperature for 1.0 minute at a press pressure of 2500 pounds per square inch. The area in square millimeters of the resulting plaque of polymer is termed the plasticity index number. A plasticity number in the range from about 1500 to 3000 is normal for nonplasticized polymeric vinylidene fluoride having desirable physical properties. A high plasticity number for the nonplasticized polymer is indicative of low molecular weight and vice versa. In carrying out the test, the sample of plasticized polymer is prepared by mixing a weighed amount of plasticizer into a weighed amount of finely divided polyvinylidene fluoride. Exactly 0.5 gram of the mixture is then used to make the test.

Results obtained by subjecting various polymer-plasticizer combinations to the plasticity index test are shown in Table II. Table II shows that the nonplasticized homopolymer of vinylidene fluoride used in carrying out the tests had a plasticity index number of 2250. The table also shows that use of a linear saturated polymeric polyester as a plasticizer is effective to increase the plasticity to the range 3000–4000, an increase of area by 33% to 78%. The linear saturated polymeric polyester thus is shown to have high efficiency as a plasticizer for polymer of vinylidene fluoride.

TABLE II

| Polymer | Plasticizing material | | Plasticity, area in sq. mm. | Compatibility | | | | |
|---|---|---|---|---|---|---|---|---|
| | Name | Phr.[1] | | Clarity | Bubbles | Color | Bloom | Surface |
| Homopolymer of vinylidene fluoride. | None | None | 2,250 | Good | None | None | None | Smooth. |
| Do | saturated polymeric polyester [2] | 15 | 4,000 | Very clear | do | do | do | Do. |
| Do | saturated polymeric polyester [3] | 15 | 3,000 | do | do | do | do | Do. |
| Do | tricresyl phosphate | 15 | 3,200 | Hazy | do | Streaky | do | Do. |
| Do | dibenzyl sebacate | 15 | 3,100 | Nearly opaque. | do | None | do | Do. |
| Do | dibutyl phthalate | 15 | 3,250 | Slightly hazy | do | do | do | Do. |
| Do | mixed fatty acid ester of pentaerythritol | 15 | 3,425 | Hazy | do | Streaky | do | Do. |
| Do | epoxidized polyester | 15 | 2,650 | Semi opaque | Many | Light tan | do | Do. |
| Do | ethylene glycol dibenzoate | 15 | 3,500 | Very hazy | do | None | Much | Do. |
| Do | tributyl phosphate | 15 | 3,250 | Slight haze | do | do | None | Rough. |

[1] Parts plasticizer material per 100 parts polymer.
[2] Polymeric 2,2-dimethyl propylene sebacate.
[3] Polymeric 1-methyl propylene adipate.

EXAMPLE 2

Compatibility of a plasticizer with a polymer is evidenced by high clarity of the plasticized polymer, freedom from bubbles, absence of color or streaks, absence of bloom and absence of surface irregularities. The comparative compatibilities of various plasticizing materials with homopolymeric vinylidene fluoride are also shown in Table II. The plaques made in the tests for efficiency of plasticizers in Example 1 were examined visually for compatibility of plasticizing material with the polymer. The data in Table II show that whereas the plaques made from a composition containing a linear saturated polymeric polyester have excellent compatibility, the plaques made with other materials, shown by way of comparison, failed to meet the necessary requirements for compatibility in one or more ways.

EXAMPLE 3

The flexibility at room temperature of plaques prepared from a composition containing 10 parts of polymeric 2,2-dimethyl propylene sebacate and 100 parts of homopolymer in comparison to the nonplasticized homopolymer is shown in Table III.

TABLE III

Material: Modulus of elasticity[1] in bending
    Nonplasticized homopolymer
      of vinylidene fluoride ____ $1.14 \times 10^5$ lbs./sq. in.
    Plasticized homopolymer of
      vinylidene fluoride _____ $0.68 \times 10^5$ lbs./sq. in.

[1] ASTM D790-58T

From the data in Table III it is seen that flexibility of the plaques prepared from the plasticized polymer is increased by about 68% over that of the plaque prepared from nonplasticized polymer.

EXAMPLE 4

The low volatility loss of plasticizer which is experienced in polymers of vinylidene fluoride plasticized with a linear saturated polymeric polyester used in practicing my invention is shown in Table IV. The volatility losses experienced with some well-known commercial plasticizers are shown by way of comparison. In each test, 15 parts of plasticizing material were mixed with 100 parts of homopolymeric vinylidene fluoride and the mixture was then pressed into a plaque as disclosed in Example 1. Each plaque was heated at 150° C. for 2 hours. The difference in weights of each plaque before and after heating was determined, and the difference is expressed as percent weight loss in Table IV. The percent weight loss is an index of the relative volatility of the plasticizer from the plasticized homopolymeric vinylidene fluoride. The low percent weight loss experienced with polymeric 1-methyl propylene adipate is an indication of the superior low volatility of the linear saturated polymeric polyesters as a class of plasticizers for polymeric vinylidene fluoride.

TABLE IV

| Plasticizer: | Percent weight loss |
|---|---|
| Polymeric 1-methyl propylene adipate, M.W. 2400 | 0.27 |
| Dibutyl sebacate | 14.02 |
| Triacetin | 7.56 |
| Diethyl adipate | 2.79 |
| Dibutyl phthalate | 10.4 |
| Tributyl citrate | 11.3 |
| Epoxidized polyester | 0.82 |

EXAMPLE 5

The low temperature flexibility of polymeric vinylidene fluoride plasticized with a saturated polymeric polyester is shown in Table V. Plaques of homopolymeric vinylidene fluoride were prepared as shown in Example 1. The plaques were then cooled in an acetone bath containing solid carbon dioxide and each plaque was bent 180 degrees to determine whether failure occurred.

TABLE V

| Plasticizer | Temperature ° C. | | | |
|---|---|---|---|---|
| | −15 | −30 | −55 | −60 |
| Polymeric 2,2-dimethyl propylene sebacate, M.W. 1100 | F | F | F | C |
| Polymeric 1-methyl propylene adipate, M.W. 2400 | F | F | F | C |

F = flexible without failure.
C = cracked.

From the data in Table V it is seen that flexibility of the polymer remains good at least to −60° C.

EXAMPLE 6

A copolymer of vinylidene fluoride was prepared from a monomer feed mixture containing 1.1 mol percent of chlorotrifluoroethylene. 100 parts of the resulting copolymer was mixed with 10 parts of polymeric 2,2-dimethyl propylene sebacate. The mixture was compression molded at 225° C. for 3 minutes at 2500 p.s.i. pressure. A clear flexible film was obtained.

EXAMPLE 7

100 parts by weight of homopolymeric vinylidene fluoride were mixed with 10 parts of polymeric 1-methyl propylene adipate. The mixture was milled for 20 minutes on a Thropp mill at 300° F. An 0.010 inch thick sheet was then molded from the milled stock in a molding press at 350° F. at a pressure of about 5000 p.s.i. onto shims. The molded sheet was transparent and free of opaqueness, voids or imperfections. It was flexible and tough. Its tensile strength was 3499 p.s.i. Percent elongation was 372%. By way of comparison, a similarly prepared film of nonplasticized homopolymeric vinylidene fluoride is rigid and has a tensile strength of 6000 p.s.i. and an elongation of 200%.

EXAMPLE 8

10 parts of polymeric 1-methyl propylene adipate were dissolved with 1000 parts of dimethylacetamide. To this solution was added 200 parts of homopolymeric vinylidene fluoride in a high speed blender. 200 parts of BaTiO₂ were then blended into the mass. The mass was then placed in a ball mill and milled overnight. The milled mass was spread onto a ferrotype plate using a doctor blade set at 60 mils. The resulting sheet was heated over a period of 15 minutes to 115° C. and then to 200° C. during a period of 35 minutes. The resulting film was uniformly 5 to 6 mils thick. It was clear and flexible.

EXAMPLE 9

2.5 parts of polymeric 1-methyl propylene adipate were mixed with 100 parts of homopolymer of vinylidene fluoride. The mixture was placed in an extruder having two heated zones of 450° F. and 480° F., respectively. The mixture was then extruded through a die having a temperature of 580° F. The orifice of the die was 30 mils. A smooth-surfaced monofilament was obtained. The filament was passed over drawing rolls and drawn at a 6 to 1 ratio at 190° C. The resulting monofilament was 11 mils±0.5 mil in diameter. Its tensile strength was 79,000 lbs./sq. in. It had an elongation at break of 18%. It had an elastic modulus of 538,000 lbs./sq. in. By comparison, the filament die processing temperature for nonplasticized homopolymeric vinylidene fluoride is 675° F., and below this temperature rough-surfaced monofilament is obtained.

Many different embodiments of this invention can be made without departing from the spirit and scope of it, and it is to be understood that the invention includes also such embodiments and is not limited by the above description.

I claim:

1. A composition comprising a mixture consisting of a major proportion of polymeric vinylidene fluoride having a crystalline structure and containing more than 95 mol percent of vinylidene fluoride with a minor proportion of a linear saturated polymeric polyester consisting essentially of recurring units of the formula

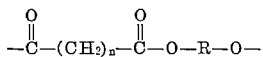

in which $n$ is an integer from 4 to 8 inclusively and R is an alkylene group having from 4 to 7 carbon atoms inclusively, said polyester having a molecular weight of from about 1100 to about 5000 and a boiling point above about 400° C.

2. The composition according to claim 1 in which the ratio of polyester to polymeric vinylidene fluoride is in the range from 1:100 to 3:100 parts by weight.

3. The composition according to claim 1 in which the ratio of polyester to polymeric vinylidene fluoride is in the range from 5:100 to 15:100 parts by weight.

4. A composition comprising a mixture consisting of (a) 100 parts by weight of crystalline polymeric vinylidene fluoride selected from the group consisting of homopolymer of vinylidene fluoride and copolymer of vinylidene fluoride with less than 5 mol percent of haloethene with (b) between 0.5 and 45 parts of a linear saturated polymeric polyester consisting essentially of recurring units of the formula

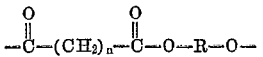

in which $n$ is an integer from 4 to 8 inclusively and R is an alkylene group having from 4 to 7 carbon atoms inclusively, said polyester having a molecular weight of from about 1100 to about 5000 and a boiling point above about 400°C.

5. The composition according to claim 4 in which the polymer in (a) is homopolymer of vinylidene fluoride.

6. The composition according to claim 4 in which the polymer in (a) is copolymer of vinylidene fluoride with less than 5 mol percent of haloethene.

7. The composition according to claim 4 in which the polyester is polymeric 2,2-dimethyl propylene sebacate.

8. The composition of claim 4 in which the polyester is polymeric 1-methyl propylene adipate.

9. A flexible, crystalline polymeric vinylidene fluoride composition prepared by a process which comprises (a) mixing from 85 to 95 parts by weight of polymeric vinylidene fluoride having a crystalline structure and containing more than 95 mol percent of vinylidene fluoride with from 5 to 45 parts of a linear saturated polymeric polyester consisting essentially of recurring units of the formula

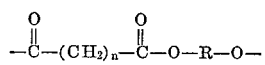

in which $n$ is an integer from 4 to 8 inclusively and R is an alkylene group having from 4 to 7 carbon atoms inclusively, said polyester having a molecular weight of from about 1100 to about 5000 and a boiling point above about 400° C., and (b) subjecting the resulting mixture to pressure and temperature conditions sufficient to fuse the mixture into a homogeneous mass.

References Cited

UNITED STATES PATENTS

| | | | |
|---|---|---|---|
| 2,435,537 | 2/1948 | Ford et al. | 260—92.1 |
| 2,468,054 | 4/1949 | Ford | 260—87.7 |
| 2,555,062 | 5/1951 | Small et al. | 260—873 |
| 2,892,162 | 6/1959 | Bennett | 333—31 X |
| 3,258,723 | 6/1966 | Osa'fune et al. | 333—29 X |
| 3,283,269 | 11/1966 | Bernstein | 333—29 |
| 3,375,475 | 3/1968 | Harris | 333—31 |
| 3,436,690 | 4/1969 | Golant et al. | 333—31 |

FOREIGN PATENTS 150,608  6/1951  Australia.

OTHER REFERENCES

Hill High Molecular Weight Plasticizers for P.V.C., British Plastics, February 1959, vol. 32, pp. 74–77.

MURRAY TILLMAN, Primary Examiner

H. ROBERTS, Assistant Examiner

U.S. Cl. X.R.

260—40, 41, 87.7, 92.1, 873